(12) United States Patent
Höntzsch et al.

(10) Patent No.: US 12,544,108 B2
(45) Date of Patent: Feb. 10, 2026

(54) EXTERNAL RETAINING DEVICE FOR BONE FRACTURES (EXTERNAL FIXATOR)

(71) Applicant: AO Technology AG, Chur (CH)

(72) Inventors: Dankward Höntzsch, Tübingen (DE); Werner Stehr, Horb (DE)

(73) Assignee: AO TECHNOLOGY AG, Chur (CH)

( * ) Notice: Subject to any disclaimer, the term of this patent is extended or adjusted under 35 U.S.C. 154(b) by 168 days.

(21) Appl. No.: 18/015,987

(22) PCT Filed: Jul. 17, 2020

(86) PCT No.: PCT/DE2020/100628
§ 371 (c)(1),
(2) Date: Jan. 13, 2023

(87) PCT Pub. No.: WO2022/012705
PCT Pub. Date: Jan. 20, 2022

(65) Prior Publication Data
US 2023/0363795 A1 Nov. 16, 2023

(51) Int. Cl.
*A61B 17/64* (2006.01)

(52) U.S. Cl.
CPC .................. *A61B 17/6466* (2013.01)

(58) Field of Classification Search
CPC ............ A61B 17/6466; A61B 17/6483; A61B 17/6458; A61B 17/645
See application file for complete search history.

(56) References Cited

U.S. PATENT DOCUMENTS

| 5,752,954 A * | 5/1998 | Mata ................... F16B 7/0493 606/53 |
| 2002/0042613 A1 | 4/2002 | Mata |
| 2006/0039750 A1 | 2/2006 | Thomke et al. |
| 2006/0211920 A1* | 9/2006 | Bethke ............... A61B 17/0206 600/234 |
| 2007/0252026 A1 | 11/2007 | Sumiya et al. |
| 2008/0247818 A1* | 10/2008 | Oesch .................... F16B 2/065 403/389 |
| 2009/0318973 A1 | 12/2009 | Moulin et al. |
| 2011/0112533 A1* | 5/2011 | Venturini ........... A61B 17/6466 606/54 |

(Continued)

FOREIGN PATENT DOCUMENTS

| DE | 8419372 U1 | 9/1984 |
| DE | 9106772 U1 | 8/1991 |

(Continued)

OTHER PUBLICATIONS

International Search Report for corresponding Application No. PCT/DE2020/100628, mailed Mar. 24, 2021.

*Primary Examiner* — Julianna N Harvey
(74) *Attorney, Agent, or Firm* — Renner, Otto, Boisselle & Sklar, LLP

(57) ABSTRACT

A joint of an external retaining device for fragments of a bone (external fixator) with circular ribs and grooves having a V-shaped cross-section, the flanks of which form frustum-shaped friction surfaces, which enable a high friction force to prevent rotation of the joint, and thereby prevent inadvertent displacement of the retaining device, and enable adjustment of the retaining device using an adjustable friction force for aligning the fragments of the bone.

12 Claims, 5 Drawing Sheets

(56) References Cited

U.S. PATENT DOCUMENTS

| | | | |
|---|---|---|---|
| 2015/0119886 A1* | 4/2015 | Milella, Jr. | A61B 17/6466 606/59 |
| 2017/0156757 A1* | 6/2017 | Muniz | A61B 17/6466 |
| 2017/0252069 A1 | 9/2017 | Muniz et al. | |
| 2018/0199962 A1 | 7/2018 | Muniz et al. | |

FOREIGN PATENT DOCUMENTS

| | | |
|---|---|---|
| EP | 1627608 A1 | 2/2006 |
| JP | 2006055647 A | 3/2006 |
| JP | 2007527980 A | 10/2007 |
| JP | 2007299437 A | 11/2007 |
| JP | 2009538658 A | 11/2009 |
| JP | 2011098201 A | 5/2011 |
| JP | 2018008029 A | 1/2018 |
| WO | 2005/085658 A1 | 9/2005 |

* cited by examiner

EXTERNAL RETAINING DEVICE FOR BONE FRACTURES (EXTERNAL FIXATOR)

TECHNICAL FIELD OF THE INVENTION

The invention relates to an external retaining device for retaining fragments of a bone following a bone fracture or, generally speaking, of skeletal parts.

BACKGROUND OF THE INVENTION

Such retaining devices are also referred to as "external fixators", and a wide variety of designs exist. These retaining devices have in common that these make it possible to attach two, or even more, fragments of a bone or individual skeletal parts to one another, in a desired position with respect to one another. The fragments are attached to one another in the original positions thereof, when the bone is not broken, so as to be retained in the desired manner. For this purpose, screws, pegs, wires or other attachment elements, which hereafter are referred to, in summary, as pins, are attached from the outside, through the skin, at or in the fragments of the bone, and the pins are, in turn, attached to the retaining device, wherein the pins can be, but do not have to be, integral parts of the retaining device.

The utility model DE 84 19 372 U1 discloses such a retaining device comprising rods and joints connecting the rods. When the joints are released, the rods can be rotated with respect to one another about the axes of the joints and, by immobilizing the joints, the rods can be connected to one another. The joints comprise two U-shaped clamping jaws having a slit that is open at one end and ends with a round hole through which the rods can be placed. Pins, which are attached in fragments of a broken bone, can be attached, likewise by way of joints, to the rods. The clamping jaws of the joints are connected by a screw, which connects the clamping jaws spaced apart from the round hole, and close to an open end of the slot, perpendicularly to the slot so that the clamping jaws can be rotated about the screw. By tightening the screw, the rods are clamped in the round holes of the clamping jaws, and the clamping jaws are tensioned with respect to one another. The clamping jaws comprise spur teeth, which surround the screw, on mutually facing sides, which hold the clamping jaws so as to prevent rotation by way of form fit when these are clamped together. To rotate the clamping jaws, the screw must be unscrewed so far that the spur teeth of the clamping jaws are disengaged from one another. Moreover, the clamping jaws can only be adjusted in the angular steps predefined by the spur teeth.

SUMMARY OF THE INVENTION

It is the object of the invention to provide a retaining device of the type described above, which facilitates an alignment of fragments of a broken bone in a desired position.

According to the invention, this object is achieved by the features of claim 1. The external retaining device according to the invention for retaining fragments of a broken bone, which can also be referred to as an external fixator, comprises two rods and one joint, which connects the rods so as to be rotatable about an axis of the joint when the joint is released, and which fixes the rods to one another when the joint is immobilized. The joint comprises two rod holders, at or in which the rods are attached or can be attached, and which can be rotated with respect to one another about the axis of the joint when the joint is released.

According to the invention, the rod holders of the joint, on mutually facing sides, comprise frustum-shaped, mirror opposite friction surfaces, which are concentric with respect to the axis of the joint and can be clamped together by way of a tensioning device.

"Frustum-shaped," to be precise, refers to lateral surfaces of a truncated cone, an axis of the truncated cone coinciding with the axis of the joint. As a result of wedge action, the clamped-together friction surfaces generate high friction, which holds the two clamped-together rod holders of the joint to prevent rotation. The friction is dependent on a tensioning force with which the two friction surfaces are clamped together, a cone angle of the frustum-shaped friction surfaces, a material pairing, and surface conditions of the friction surfaces (dry, moist, lubricated, soiled, and the like). The cone angle is selected to be so acute as to achieve high friction, which holds the rods to prevent rotation about the axis of the joint, wherein self-locking, which is to say, clamping of the clamped-together friction surfaces against one another, without a tensioning force, is also to be avoided.

The tensioning device can comprise a screw, for example, which extends through insertion holes in the rod holders that are coaxial with the axis of the joint and which can be screwed into an internal thread in one of the tensioning devices or is screwed onto a nut.

"Mirror opposite" means friction surface pairs that complement one another, one of which has the shape of an inside truncated cone and the other has the shape of an outside truncated cone having the same cone angle and the same diameter.

Pins, which are attached or can be attached to or in the fragments of the broken bone, can be attached to the rods, by way of joints according to the invention or in another manner. Such pins are screws, pegs, wires or other attachment elements.

The retaining device according to the invention can comprise more than two rods, two of which are in each case connected to a joint in a manner that allows the angle to be adjusted. Parallel rods may also be connected to more than one joint. Moreover, the retaining device can comprise pins or the like, for attachment to or in the fragments of the broken bone, which are each attached by way of a joint to one of the rods of the retaining device. An attachment of a pin to multiple rods by way of multiple joints is also conceivable.

The invention enables a high friction force to prevent the rod holders of the joint from rotating, using a relatively small axial tensioning force. Another advantage is continuous angular adjustability of the rods. If the joint is only partially loosened, the rods can be pivoted manually with respect to one another by overcoming the friction between the rod holders, and the fragments of the broken bone attached to the rods can thereby be aligned, wherein the friction force is so great that the fragments maintain the positions thereof without the action of an external force. By adjusting the tensioning force, the friction force of the joints to prevent pivoting of the rods can be individually adjusted to a desired level. Once the fragments have been moved into the desired position, the joint is clamped, whereby the positions of the rods, including the fragments of the broken bone attached thereto, are fixed with respect to one another. It is possible to connect more than two rods, and, in principle, an arbitrary number of rods to one another by way of a corresponding number of joints.

According to a refinement of the invention, each rod holder comprises two, or even more, frustum-shaped friction surfaces that are concentric with respect to one another and with respect to the axis of the joint and enclose one another. Each rod holder preferably has an inside frustum-shaped friction surface and an outside frustum-shaped friction surface, which concentrically encloses the inside frustum-shaped friction surface or is concentrically enclosed by the inside frustum-shaped friction surface. A second rod holder of the joint comprises frustum-shaped friction surfaces that are the mirror opposite of the two friction surfaces of a first rod holder. The friction surfaces are disposed on mutually facing sides of the rod holders so that these can be clamped together by way of the tensioning device. One rod holder, for example, comprises a circular rib, which is concentric with respect to the axis of the joint and has an inverted V cross-section on a side facing the other rod holder of the same joint, and the other rod holder has a, likewise circular, groove, which is concentric with respect to the axis of the joint and has a V cross-section. "Inverted" means that the tip of the V cross-section of the rib faces the groove. The rib and the groove have the same diameter and mirror opposite cross-sections. Lateral surfaces of the rib and the groove cheeks form the frustum-shaped friction surfaces. The tip of the V cross-section of the rib is preferably flattened so as not to rest on a groove base, which can likewise be flattened. The friction surfaces of a rod holder can have identical or differing cone angles, and assigned mirror opposite friction surfaces of the two rod holders of a joint have identical cone angles and identical diameters. The doubling or multiplication of the friction surfaces achieved by way of this design of the invention doubles or multiplies the friction between the rod holders of the joints, with the axial tensioning force remaining the same, so that the clamped-together rod holders are held reliably against one another to prevent rotation.

Another advantage of the plurality of friction surfaces is a low surface pressure, which improves sliding of the friction surfaces on one another when the tensioning device is loosened for adjusting the joint. The rod holders and, along with these, the rods can thus be rotated with respect to one another in a jerk-free manner.

A preferred embodiment of the invention provides a further, frustum-shaped friction surface, which is concentric with respect to the axis of the joint, on a side of the second rod holder of the joint facing away from the first rod holder. This friction surface cooperates with a friction surface that is the mirror opposite of the further friction surface, which is non-rotatably and axially movably connected to the first rod holder and which is disposed on the side of the second rod holder facing away from the first rod holder and faces the friction surface of the second rod holder. The friction surface pairs on the side of the second rod holder facing away from the first rod holder are preferably clamped together by way of the same tensioning device as that of the rod holders that is used to clamp together the friction surface pairs at the mutually facing sides thereof. The friction surface pairs on the side of the second rod holder facing away from the first rod holder likewise double the friction force between the rod holders of the joint to prevent rotation. This embodiment of the invention can also comprise multiple, inside frustum-shaped and outside frustum-shaped friction surfaces that concentrically enclose one another, which doubles or multiplies the friction force to prevent rotation yet again.

So as to non-rotatably connect the friction surface that is the mirror opposite of the further friction surface of the second rod holder to the first rod holder, an embodiment provides a shaft, which is non-rotatable with respect to the first rod holder and coaxial with respect to the axis of the joint and which extends through a through-hole in the second rod holder that is coaxial with respect to the axis of the joint, for example, and at which the friction surface that is the mirror opposite of the further friction surface is guided in a non-rotatable and axially movable manner. The shaft can be part of the tensioning device and transfer the axial tensioning force, which is used for tensioning all friction surfaces of the joint with respect to one another, between the first rod holder and the friction surface that is the mirror opposite of the further friction surface. For example, the shaft can be formed by a threaded bolt, which forms a rigid unit with the first rod holder, or by a screw, the screw head of which is connected to the first rod holder in a non-rotatable and tension-resistant manner. The shaft that is non-rotatable with respect to the first rod holder also holds the friction surface that is the mirror opposite of the further friction surface to prevent co-rotation with the second rod holder when the rods connected by the joint are pivoted with respect to one another, the tensioning force and the friction force not being altered by the pivoting of the rod holders including the rods.

An embodiment of the invention provides a push-off spring, which pushes the friction surfaces off one another when the tensioning force is decreased or released. The push-off spring counteracts self-locking, which is to say clamping of the frustum-shaped friction surfaces against one another, and allows smooth angular adjustability of the rod holders including the rods, using an adjustable friction force, by a decrease in the tensioning force.

To compensate for manufacturing tolerances, an embodiment of the invention provides radially elastically designed friction surfaces, wherein it suffices when a portion of the friction surfaces is radially elastic.

An embodiment of the invention provides releasable clamps for clamping the rods and/or the pins in place. The rod holders can comprise tensioning jaw pairs, for example, between which the rods and/or the pins are disposed and chucked. The tensioning jaw pairs can be clamped together by way of the tensioning device, which also clamps the friction surfaces together. The tensioning jaw pairs can also be clamped together in another manner. The tensioning jaw pairs can, for example, be elastically connected to one another in one piece, or can be composed of two or more pieces.

An embodiment of the invention provides that one, multiple or all clamps comprise clamping devices for rods having differing rod cross-sections. For example, the tensioning jaw pairs of the clamps can comprise mutually facing grooves having differing cross-sections in which the rods or pins can be disposed and clamped.

All of the features mentioned in the description and/or shown in the drawings can be implemented individually alone or in any arbitrary combination in embodiments of the invention. Embodiments of the invention that do not comprise all, but only some of the features of a claim, including of the independent claim, are possible.

BRIEF DESCRIPTION OF THE DRAWINGS

The invention will be described hereafter in greater detail based on one exemplary embodiment shown in the drawing. In the drawings.

DETAILED DESCRIPTION OF THE INVENTION

Figure 1:
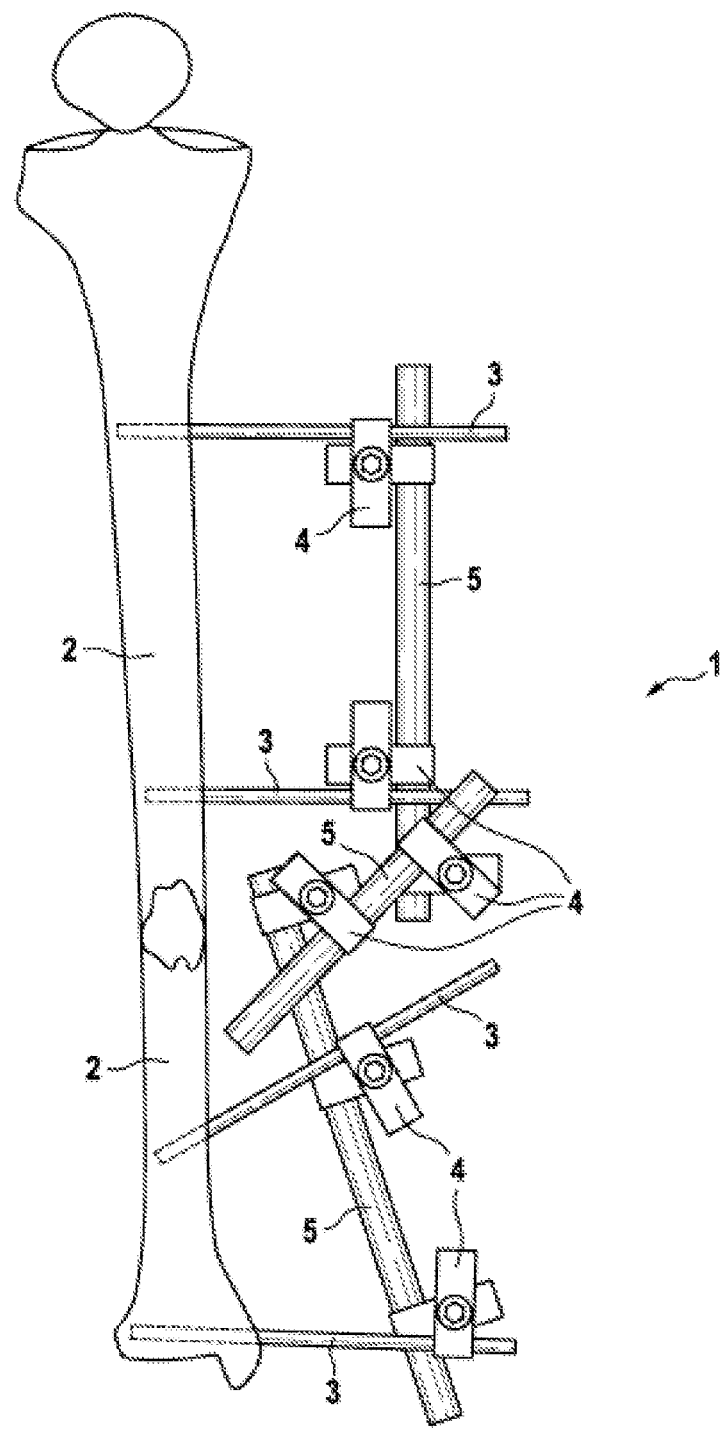
FIG. 1 shows a use of an external retaining device according to the invention for retaining fragments of a broken bone (external fixator)

The external retaining device 1 according to the invention shown in FIG. 1 is used to join fragments 2 of a broken bone, generally speaking, for retaining skeletal parts in an intended position with respect to one another. The external retaining device 1 is also referred to as an external fixator.

For attaching the retaining device 1 to the fragments 2 of the broken bone or, vice versa, for attaching the fragments 2 to the retaining device 1, one or more bone screws are screwed from the outside, through the skin of a patient, into each fragment 2. Instead of the bone screws, it is also possible to attach pegs, wires or other peg-shaped or otherwise shaped attachment elements, which are available now or developed in the future, to or in the fragments 2 of the bone. The attachment elements are referred to as pins 3 here, regardless of whether these have the shape of a pin.

Figure 2:
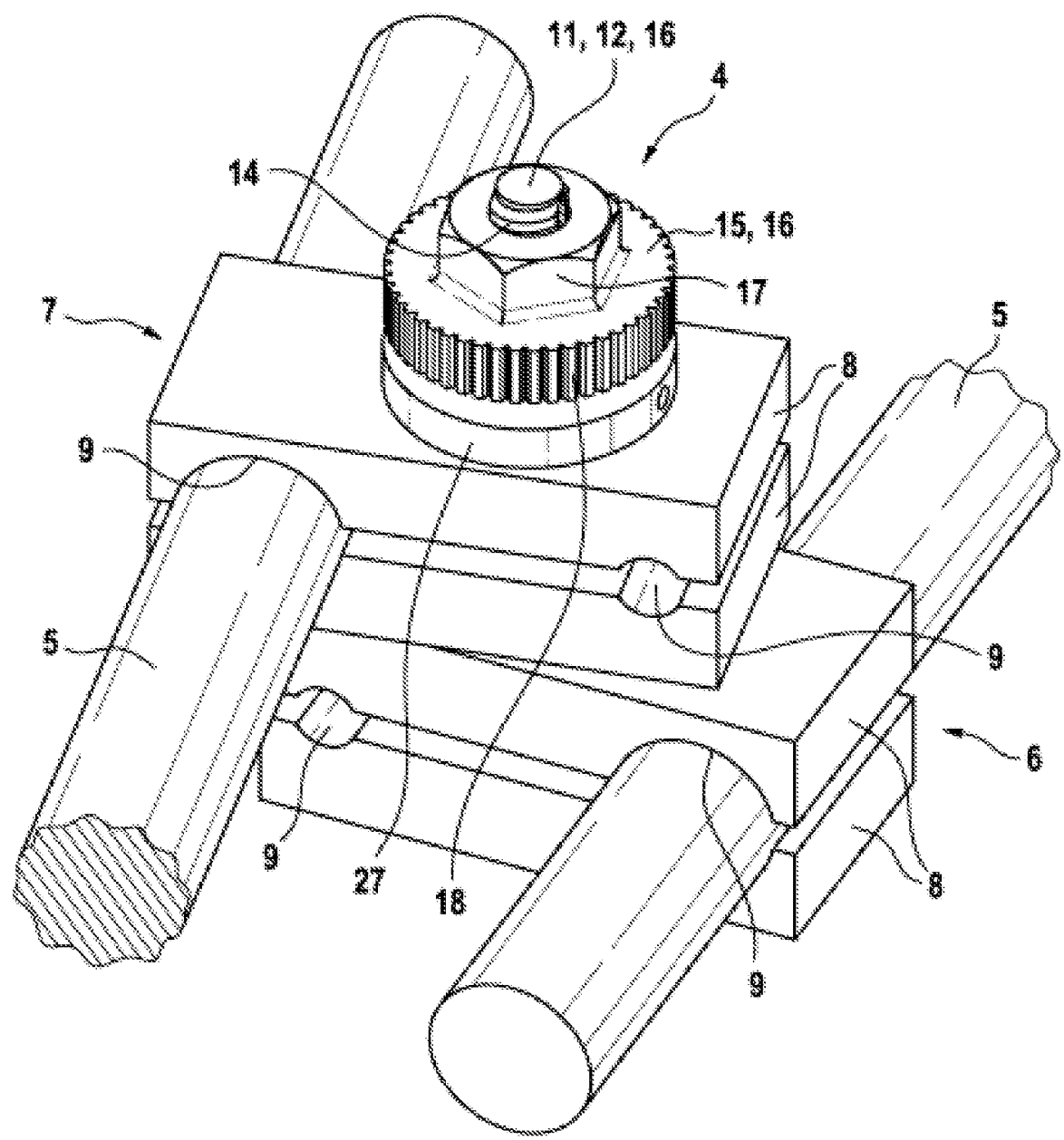
FIG. 2 shows of two rods and a joint, connecting the rods, of the retaining device from FIG. 1 in a perspective illustration.
Figure 3:
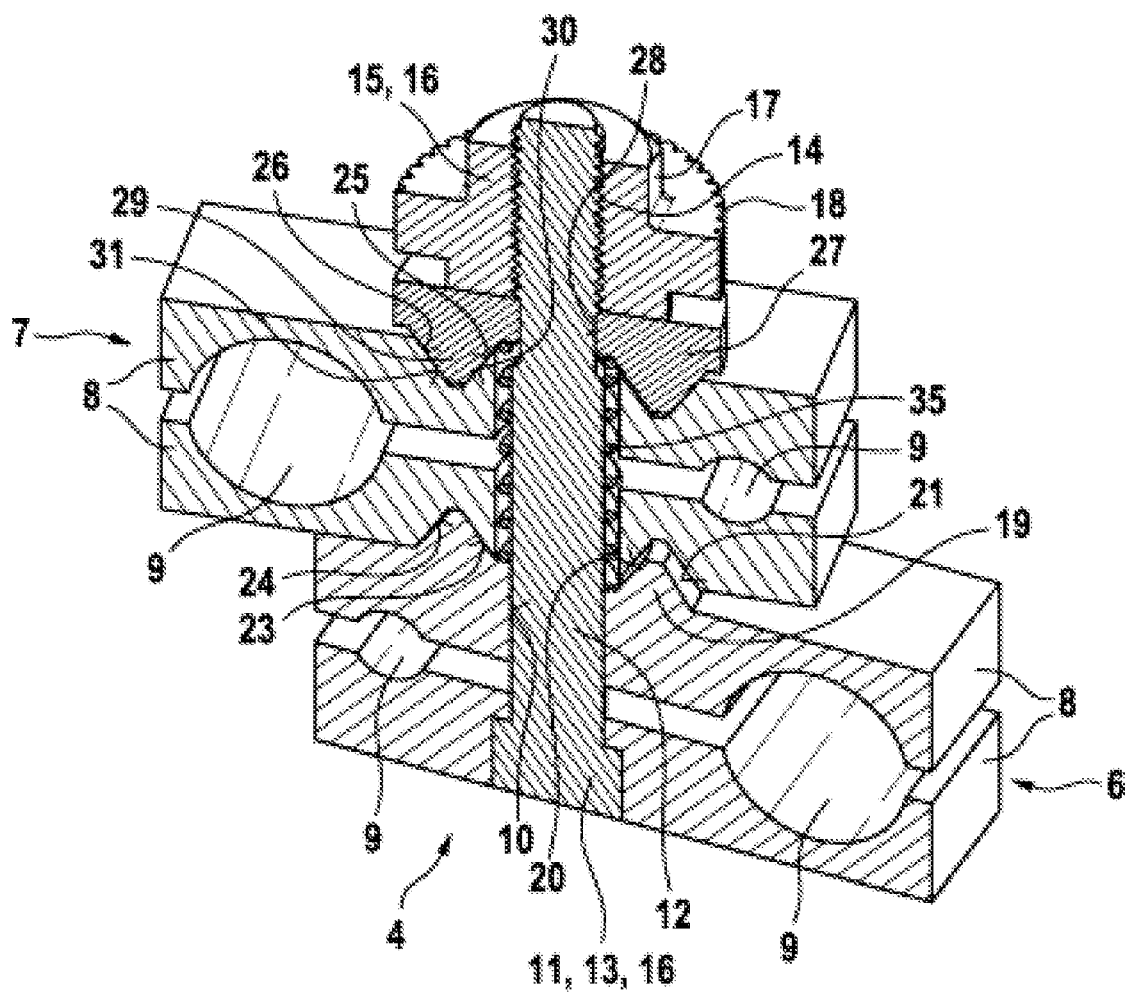
FIG. 3 shows a perspective axial sectional illustration of the joint from FIG. 2.
Figure 4:
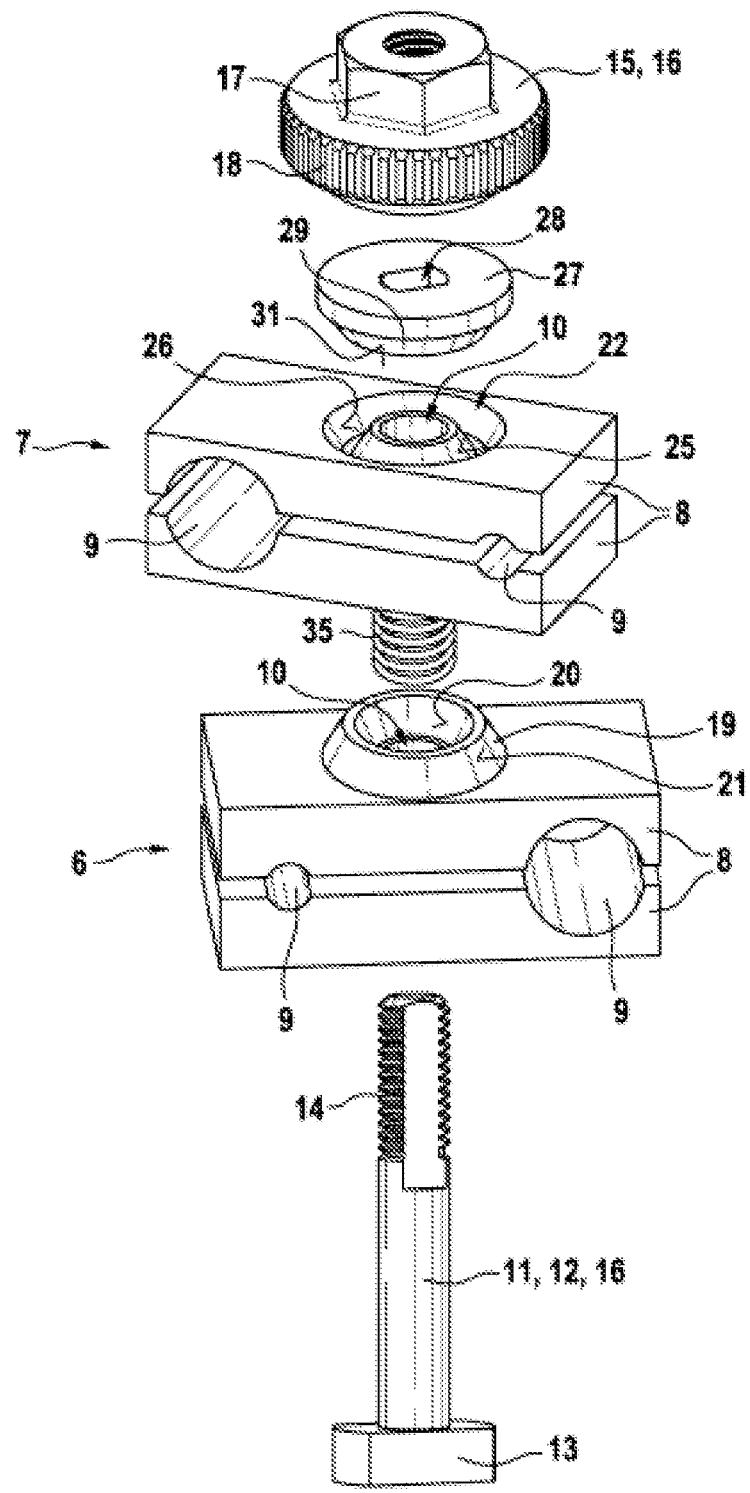
FIG. 4 shows a perspective exploded view of individual parts of the joint from FIG. 3.

With the aid of joints 4, a rod 5 is attached to the pins 3 of each fragment 2 of the broken bone, and the rods 5 are connected to one another by way of joints 4. The joints 4 and the individual parts thereof are shown in FIGS. 2 to 4.

Each joint 4 comprises two rod holders 6, 7, which can be rotated with respect to one another about an axis and can be non-rotatably clamped together and to or in which the rods 5 and the pins 3 can be attached or are attached. The rod holders 6, 7 are designed as clamps and comprise clamping jaws 8, between which the pins 3 and the rods 5 can be clamped in place. The axis about which the rod holders 6, 7 can be rotated with respect to one another forms an axis of the joint 4. Each clamping jaw 8 can comprise clamping devices, for example grooves, for one, two or more different pins 3 and/or rods 5.

The clamping jaws 8 comprise two clamping grooves 9 in mutually facing inner surfaces, and have a through-hole 10 between the clamping grooves 9. Internal surfaces are the mutually facing sides of the clamping jaws 8 of a rod holder 6, 7. The through-holes 10 extend perpendicularly to the clamping grooves 9 or perpendicularly to the inner surfaces of the clamping jaws 8 in which the clamping grooves 9 are provided. The through-holes 10 of all clamping jaws 8 of a joint 4 are aligned with one another. One clamping groove 9 is in each case designed such that a pin 3 can be inserted therein and clamped in place therein. The respective other clamping groove 9 is provided for inserting and clamping a rod 5 in place. In the exemplary embodiment, the clamping grooves 9 have semi-circular cross-sections, having the diameter of the pins 3 or of the rods 5. The clamping grooves 9 can also have other cross-sections, for example V-shaped or trapezoidal cross-sections (not shown).

A screw 11 is placed through the through-holes 10 of the clamping jaws 8, which are respective pairs forming the two rod holders 6, 7, the shank of the screw forming a shaft 12, which rotatably connects the clamping jaws 8 or the rod holders 6, 7 so as to be rotatable about a longitudinal axis of the shaft 12. The longitudinal axis of the shaft 12 forms an axis of the joint 4.

A screw head 13 of the screw 11 has two parallel surfaces at the circumference thereof and is inserted in a complementary depression in an outer side of an outer clamping jaw 8 of a first of the two rod holders 6, in which the screw head 13 is accommodated in a non-rotatable and tension-resistant manner, so that the shank of the screw, which forms the shaft 12, is non-rotatably connected to the outer clamping jaw 8 of the first rod holder 6. Screw heads 13 having different shapes, for example quadrangular or hexagonal screw heads, which are non-rotatably inserted in a complementary depression in the outer side of the outer clamping jaw 8 are likewise possible (not shown). The shaft 12 can also be joined to the outer clamping jaw 8 in another manner, for example be welded thereto (not shown).

A nut 15, which holds the rod holders 6, 7 on the shaft 12, is screwed onto a thread 14 of the shank of the screw 11 forming the shaft 12. The screw 11 and the nut 15 form a tensioning device 16, by way of which the rod holders 6, 7 or the clamping jaws 8 can be clamped together. In the exemplary embodiment, the nut 15 has a hexagon 17 for applying a tool wrench, which is not shown, such as or an open-ended spanner or a ring spanner, and a knurl 18 at a circumference of the nut 15 for turning the nut 15 manually.

On an outer side, an inner clamping jaw 8 of the first rod holder 6 comprises a circular rib 19 having a V-shaped cross-section, which concentrically encloses the through-hole 10. The clamping jaw 8 of the first rod holder 6 which faces the other, which is to say the second, rod holder 7 of the joint 4 is referred to as an inner clamping jaw 8. The outer side likewise faces the other, which is to say the second, rod holder 7. Flanks of the rib 19 form two frustum-shaped friction surfaces 20, 21, wherein an inner, inside frustum-shaped friction surface 20 is also referred to hereafter as a first friction surface 20, and an outer friction surface 21, which has the shape of an outer frustum, is also referred to hereafter as a second friction surface 21. To be precise, the friction surfaces 20, 21 and also all further friction surfaces 23, 24, 25, 26, 30, 31 yet to be described have the shape of lateral surfaces of inside or outside truncated cones.

In the outer sides facing away from one another, both clamping jaws 8 of the second rod holder 7 comprise circular grooves 22, which concentrically enclose the through-holes 10 of the clamping jaws 8. The grooves 22 have the same diameter as the rib 19 and V-shaped cross-sections that are the mirror opposite of the rib 19. Flanks of the grooves 22 form friction surfaces 23, 24, 25, 26 that are the mirror opposite of the friction surfaces 20, 21 of the rib 19, which hereafter are also referred to as third, fourth, fifth and sixth friction surfaces 23, 24, 25, 26.

A circular disk 27 having a central hole 28, on which the shank of the screw 11 forming the shaft 12 is disposed, is disposed between an outer clamping jaw 8 of the second rod holder 7 and the nut 15. The central hole 28 comprises two surfaces that are parallel to one another, as a result of which the disk 27 cannot be rotated on the shaft 12, which in the region of the thread 14 likewise comprises two surfaces that are parallel to one another, spaced the same distance apart as the parallel surfaces of the central hole 28 of the disk 27. Since the shaft 12 cannot be rotated with respect to the outer clamping jaw 8 of the first rod holder 6, the disk 27 is non-rotatable with respect to the outer clamping jaw 8 of the first rod holder 6. Axially, the disk 27 is movable on the shaft 12.

On the side facing the outer clamping jaw 8 of the second rod holder 7, the disk 27 comprises a circular rib 29, which concentrically encloses the central hole 28, has the same diameter as the groove 22 in the clamping jaw 8, and has a mirror opposite V-shaped cross-section. The flanks of the rib 29 form a seventh and an eighth friction surface 30, 31 of the joint 4.

By tightening the nut 15 on the screw 11, which together with the screw 11 forms the tensioning device 16, the rod holders 6, 7, the clamping jaws 8, the disk 27, and the total of eight friction surfaces 20, 21, 23, 24, 25, 26, 30, 31 can be clamped together, so that the rods 5 and pins 3 inserted in the clamping grooves 9 of the clamping jaws 8 are fixedly chucked between the clamping jaws 8, and the clamping jaws 8 or the rod holders 6, 7 are held non-rotatably against one another by way of friction between the friction surfaces 20, 21, 23, 24, 25, 26, 30, 31 which rest against one another and are tensioned with respect to one another. As a result of wedge action, the conical shape of the friction surfaces 20, 21, 23, 24, 25, 26, 30, 31 causes a high friction force between the friction surfaces 20, 21, 23, 24, 25, 26, 30, 31, and the total of eight friction surfaces 20, 21, 23, 24, 25, 26, 30, 31 octuplicate the friction force, so that, using a comparatively low tensioning force that is applied, the rod holders 6, 7 are held reliable against one another to prevent rotation. It is provided to tighten the nut 15 by way of a tool wrench, for example an open-ended spanner or ring spanner. Possibly, it may even suffice to tighten the nut 15 by hand. It is also conceivable to provide a quick release skewer, such as is known from bicycles, or a different eccentric lever for clamping the tensioning device 16 (not shown). Such a quick release skewer is, in particular, provided at the screw head 13.

By loosening the nut 15, the rods 5 and pins 3 can be displaced in the clamping grooves 9 of the clamping jaws 8, and the clamping jaws 8 or the rod holders 6, 7 can be rotated with respect to one another, whereby the rods 5 and the pins 3 and the fragments 2 of the bone or the skeletal parts attached thereto can be brought into a desired position with respect to one another. For aligning the rod holders 6, 7, clamping jaws 8, rods 5 and pins 3, the friction force between the friction surfaces 20, 21, 23, 24, 25, 26, 30, 31 can be adjusted in a finely metered manner by the tensioning force generated by way of the nut 15.

Tips of the ribs 19, 29 are flattened so as not to rest on a base of the grooves 22.

A helical compression spring is disposed in cylindrical depressions of the through-holes 10 of the inner clamping jaws 8 of the two rod holders 6, 7, serving as a push-off spring 35, which pushes the clamping jaws 8 and the friction surfaces 20, 21, 23, 24, 25, 26, 30, 31 off one another when these are not clamped together by way of the tensioning device 16. In this way, the friction forces between the friction surfaces 20, 21, 23, 24, 25, 26, 30, 31 for pivoting the rods 5 and the pins 3 can be metered well by way of the nut 15.

Figure 5:
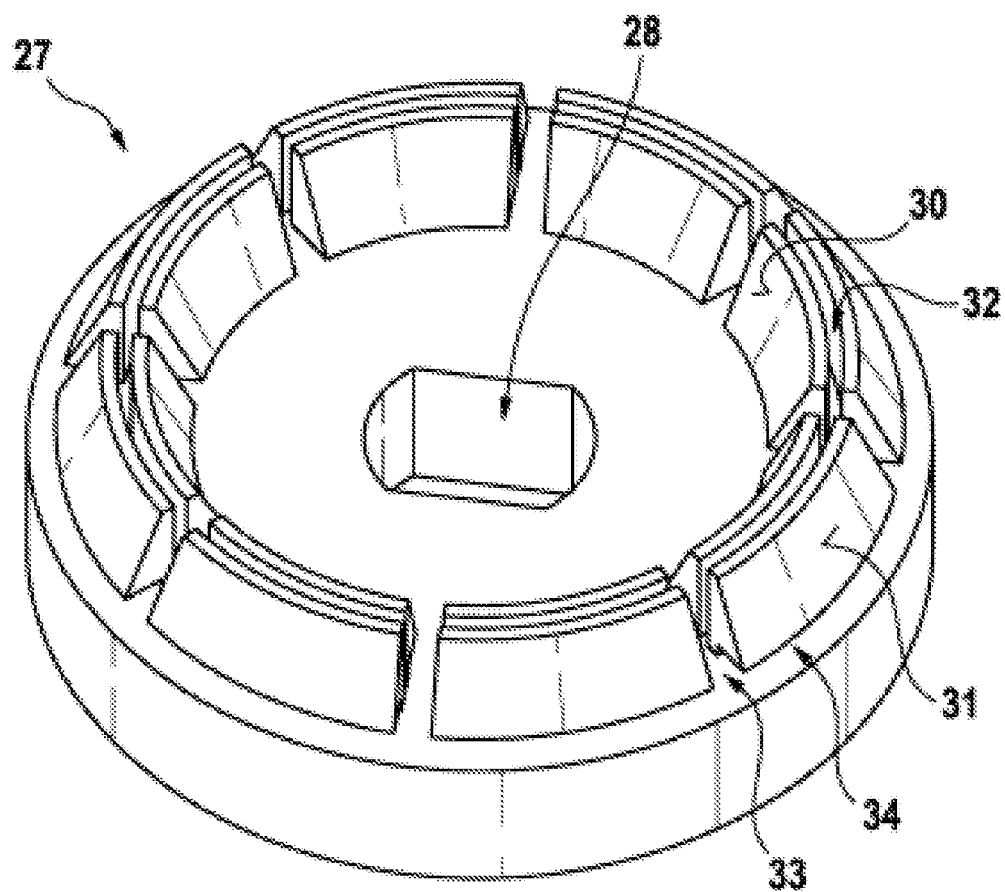
FIG. 5 shows an individual part of the joint from FIG. 2 in a modified embodiment of the invention in a perspective illustration.

FIG. 5 shows a disk 27 comprising an alternatively designed rib 29 having a V-shaped cross-section, the flanks of which form the seventh and the eight friction surfaces 30, 31. The rib 29 is divided by a cylindrical slot 32 into an outer part and an inner part. Additionally, radial slots 33 divide the rib 29 into multiple sectors. Additionally, a slot 34 is provided in a radial plane at a foot of the rib 29, in the exemplary embodiment only from the outside. As a result of the slots 32, 33, 34, the friction surfaces 30, 31 are resilient in the radial direction, thus being radially elastic. In this way, for the purpose of compensating for manufacturing tolerances, the friction surfaces 30, 31 are able to conform to the mirror opposite friction surfaces 23, 24, 25, 26 in the grooves in the outer sides of the clamping jaws 8 of the second rod holder 7. The rib 19 on the outer side of the inner clamping jaw 8 of the first rod holder 6 can also include such slots 32, 33, 34.

The invention claimed is:

1. An external retaining device for retaining fragments of a broken bone or of skeletal parts, comprising two rods and a joint, which connects the two rods so as to be rotatable about an axis and which can be immobilized to prevent rotation, the joint comprising two rod holders to which the rods are attached, and the two rod holders being rotatable respect to one another about the axis, wherein a first of the two rod holders comprises a first, frustum-shaped friction surface that is concentric with respect to the axis, and the second rod holder comprises a mirror opposite, likewise frustum-shaped third friction surface, which faces the first friction surface and is concentric with respect to the axis, and that the retaining device comprises a tensioning device, by way of which the two friction surfaces can be tensioned with respect to one another so that the two rod holders are held against one another to prevent rotation by way of frictional engagement between the frustum-shaped friction surfaces;

wherein the second rod holder comprises a fifth frustum-shaped friction surface, which is concentric with respect to the axis and faces away from the first rod holder, and that the joint comprises a frustum-shaped seventh friction surface, which is concentric with respect to the axis, is the mirror opposite of the fifth friction surface, and which faces the fifth friction surface and cannot be rotated with respect to the first rod holder even when the tensioning device is loosened, and that the tensioning device, simultaneously with the first and third friction surfaces, also tensions the fifth and seventh friction surface with respect to one another, so that, in addition to the first and third friction surfaces, also the fifth and seventh friction surfaces hold the two rod holders between one another by frictional engagement to prevent rotation; and wherein the joint comprises a shaft, which is rigidly fixed to the first rod holder such that the shaft cannot be rotated with respect to the first rod holder even when the tensioning device is loosened and which shaft is coaxial with respect to the axis and which shaft extends through the first rod holder and non-rotatably connects the seventh friction surface to the first rod holder.

2. The retaining device according to claim 1, wherein the first rod holder comprises a frustum-shaped second friction surface, which is concentric with respect to the axis and concentrically encloses the first friction surface, and the second rod holder comprises a frustum-shaped fourth friction surface, which is the mirror opposite of the second friction surface, faces the second friction surface and is concentric with respect to the axis and which concentrically encloses the third friction surface, and that the tensioning device, simultaneously with the first and third friction surfaces, also tensions the second and fourth friction surfaces with respect to one another, so that, in addition to the first and third friction surfaces, also the second and fourth friction surfaces hold the two rod holders between one another by way of frictional engagement to prevent rotation.

3. The retaining device according to claim 2, wherein the second rod holder comprises a sixth, frustum-shaped friction surface, which is concentric with respect to the axis and faces away from the first rod holder and which concentrically encloses the fifth friction surface, and that the joint comprises a frustum-shaped eighth friction surface, which is concentric with respect to the axis, the mirror opposite of the sixth friction surface and faces the sixth friction surface and which cannot be rotated with respect to the first rod holder, and that the tensioning device, simultaneously with the first and third friction surfaces, also tensions the sixth and eighth friction surfaces with respect to one another, so that, in addition to the first friction surface, the second friction surface, the third friction surface, the fourth friction surface, the fifth friction surface, and the seventh friction surface, also the sixth and eighth friction surfaces hold the two rod holders between one another by frictional engagement to prevent rotation.

4. The retaining device according to claim 1, wherein the shaft is part of the tensioning device, and that the shaft transfers an axial tensioning force, used for tensioning the first friction surface and the third friction surface with respect to one another, from the second rod holder to the seventh friction surface.

5. The retaining device according to claim 1, wherein the joint comprises a push-off spring, which pushes the friction surfaces off one another when these are not tensioned with respect to one another by way of the tensioning device, so that the two rod holders, including the two rods, can be smoothly rotated with respect to one another in an adjustable manner when the tensioning device is released.

6. The retaining device according to claim 1, wherein the friction surfaces are radially elastic.

7. The retaining device according to claim 1, wherein the two rod holders comprise releasable clamps in which the two rods are clamped in place.

8. The retaining device according to claim 7, wherein at least one rod holder comprises a clamp comprising clamping devices for rods having differing rod cross-sections.

9. An external retaining device for retaining fragments of a broken bone or of skeletal parts, comprising two rods and a joint, which connects the two rods so as to be rotatable about an axis and which can be immobilized to prevent rotation, the joint comprising two rod holders to which the rods are attached, and the two rod holders being rotatable respect to one another about the axis,
wherein a first of the two rod holders comprises a first, frustum-shaped friction surface that is concentric with respect to the axis, and the second rod holder comprises a mirror opposite, likewise frustum-shaped third friction surface, which faces the first friction surface and is concentric with respect to the axis, and that the retaining device comprises a tensioning device, by way of which the two friction surfaces can be tensioned with respect to one another so that the two rod holders are held against one another to prevent rotation by way of frictional engagement between the frustum-shaped friction surfaces;
wherein the second rod holder comprises a fifth frustum-shaped friction surface, which is concentric with respect to the axis and faces away from the first rod holder, and that the joint comprises a frustum-shaped seventh friction surface, which is concentric with respect to the axis, is the mirror opposite of the fifth friction surface, and which faces the fifth friction surface and cannot be rotated with respect to the first rod holder, and that the tensioning device, simultaneously with the first and third friction surfaces, also tensions the fifth and seventh friction surface with respect to one another, so that, in addition to the first and third friction surfaces, also the fifth and seventh friction surfaces hold the two rod holders between one another by frictional engagement to prevent rotation;
wherein the joint comprises a shaft, which is rigidly fixed to the first rod holder such that the shaft cannot be rotated with respect to the first rod holder and is coaxial with respect to the axis and which extends through the first rod holder and non-rotatably connects the seventh friction surface to the first rod holder; and
wherein the first rod holder comprises a frustum-shaped second friction surface, which is concentric with respect to the axis and concentrically encloses the first friction surface, and the second rod holder comprises a frustum-shaped fourth friction surface, which is the mirror opposite of the second friction surface, faces the second friction surface and is concentric with respect to the axis and which concentrically encloses the third friction surface, and that the tensioning device, simultaneously with the first and third friction surfaces, also tensions the second and fourth friction surfaces with respect to one another, so that, in addition to the first and third friction surfaces, also the second and fourth friction surfaces hold the two rod holders between one another by way of frictional engagement to prevent rotation.

10. An external retaining device for retaining fragments of a broken bone or of skeletal parts, comprising two rods and a joint, which connects the two rods so as to be rotatable about an axis and which can be immobilized to prevent rotation, the joint comprising two rod holders to which the rods are attached, and the two rod holders being rotatable respect to one another about the axis,
wherein a first of the two rod holders comprises a first, frustum-shaped friction surface that is concentric with respect to the axis, and the second rod holder comprises a mirror opposite, likewise frustum-shaped third friction surface, which faces the first friction surface and is concentric with respect to the axis, and that the retaining device comprises a tensioning device, by way of which the two friction surfaces can be tensioned with respect to one another so that the two rod holders are held against one another to prevent rotation by way of frictional engagement between the frustum-shaped friction surfaces;
wherein the second rod holder comprises a fifth frustum-shaped friction surface, which is concentric with respect to the axis and faces away from the first rod holder, and that the joint comprises a frustum-shaped seventh friction surface, which is concentric with respect to the axis, is the mirror opposite of the fifth friction surface, and which faces the fifth friction surface and cannot be rotated with respect to the first rod holder, and that the tensioning device, simultaneously with the first and third friction surfaces, also tensions the fifth and seventh friction surface with respect to one another, so that, in addition to the first and third friction surfaces, also the fifth and seventh friction surfaces hold the two rod holders between one another by frictional engagement to prevent rotation;
wherein the joint comprises a shaft, which is rigidly fixed to the first rod holder such that the shaft cannot be rotated with respect to the first rod holder and is coaxial with respect to the axis and which extends through the first rod holder and non-rotatably connects the seventh friction surface to the first rod holder; and
wherein the joint comprises a push-off spring, which pushes the friction surfaces off one another when these are not tensioned with respect to one another by way of the tensioning device, so that the two rod holders, including the two rods, can be smoothly rotated with respect to one another in an adjustable manner when the tensioning device is released.

11. An external retaining device for retaining fragments of a broken bone or of skeletal parts, comprising two rods and a joint, which connects the two rods so as to be rotatable about an axis and which can be immobilized to prevent rotation, the joint comprising two rod holders to which the rods are attached, and the two rod holders being rotatable respect to one another about the axis, wherein a first of the two rod holders comprises a first, frustum-shaped friction surface that is concentric with respect to the axis, and the second rod holder comprises a mirror opposite, likewise frustum-shaped third friction surface, which faces the first friction surface and is concentric with respect to the axis, and that the retaining device comprises a tensioning device, by way of which the two friction surfaces can be tensioned with respect to one another so that the two rod holders are held against one another to prevent rotation by way of frictional engagement between the frustum-shaped friction surfaces;

wherein the second rod holder comprises a fifth frustum-shaped friction surface, which is concentric with respect to the axis and faces away from the first rod holder, and that the joint comprises a frustum-shaped seventh friction surface, which is concentric with respect to the axis, is the mirror opposite of the fifth friction surface, and which faces the fifth friction surface and cannot be rotated with respect to the first rod holder, and that the tensioning device, simultaneously with the first and third friction surfaces, also tensions the fifth and seventh friction surface with respect to one another, so that, in addition to the first and third friction surfaces, also the fifth and seventh friction surfaces hold the two rod holders between one another by frictional engagement to prevent rotation;

wherein the joint comprises a shaft, which is rigidly fixed to the first rod holder such that the shaft cannot be rotated with respect to the first rod holder and is coaxial with respect to the axis and which extends through the first rod holder and non-rotatably connects the seventh friction surface to the first rod holder;

wherein the first rod holder comprises a frustum-shaped second friction surface, which is concentric with respect to the axis and concentrically encloses the first friction surface, and the second rod holder comprises a frustum-shaped fourth friction surface, which is the mirror opposite of the second friction surface, faces the second friction surface and is concentric with respect to the axis and which concentrically encloses the third friction surface, and that the tensioning device, simultaneously with the first and third friction surfaces, also tensions the second and fourth friction surfaces with respect to one another, so that, in addition to the first and third friction surfaces, also the second and fourth friction surfaces hold the two rod holders between one another by way of frictional engagement to prevent rotation; and wherein the second rod holder comprises a sixth, frustum-shaped friction surface, which is concentric with respect to the axis and faces away from the first rod holder and which concentrically encloses the fifth friction surface, and that the joint comprises a frustum-shaped eighth friction surface, which is concentric with respect to the axis, the mirror opposite of the sixth friction surface and faces the sixth friction surface and which cannot be rotated with respect to the first rod holder, and that the tensioning device, simultaneously with the first and third friction surfaces, also tensions the sixth and eighth friction surfaces with respect to one another, so that, in addition to the first friction surface, the second friction surface, the third friction surface, the fourth friction surface, the fifth friction surface, and the seventh friction surface, also the sixth and eighth friction surfaces hold the two rod holders between one another by frictional engagement to prevent rotation.

12. An external retaining device for retaining fragments of a broken bone or of skeletal parts, comprising two rods and a joint, which connects the two rods so as to be rotatable about an axis and which can be immobilized to prevent rotation, the joint comprising two rod holders to which the rods are attached, and the two rod holders being rotatable respect to one another about the axis, wherein a first of the two rod holders comprises a first, frustum-shaped friction surface that is concentric with respect to the axis, and the second rod holder comprises a mirror opposite, likewise frustum-shaped third friction surface, which faces the first friction surface and is concentric with respect to the axis, and that the retaining device comprises a tensioning device, by way of which the two friction surfaces can be tensioned with respect to one another so that the two rod holders are held against one another to prevent rotation by way of frictional engagement between the frustum-shaped friction surfaces;

wherein the second rod holder comprises a fifth frustum-shaped friction surface, which is concentric with respect to the axis and faces away from the first rod holder, and that the joint comprises a frustum-shaped seventh friction surface, which is concentric with respect to the axis, is the mirror opposite of the fifth friction surface, and which faces the fifth friction surface and cannot be rotated with respect to the first rod holder, and that the tensioning device, simultaneously with the first and third friction surfaces, also tensions the fifth and seventh friction surface with respect to one another, so that, in addition to the first and third friction surfaces, also the fifth and seventh friction surfaces hold the two rod holders between one another by frictional engagement to prevent rotation;

wherein the joint comprises a shaft, which is rigidly fixed to the first rod holder such that the shaft cannot be rotated with respect to the first rod holder and is coaxial with respect to the axis and which extends through the first rod holder and non-rotatably connects the seventh friction surface to the first rod holder; and wherein the first rod holder comprises a frustum-shaped second friction surface, which is concentric with respect to the axis and concentrically encloses the first friction surface, and the second rod holder comprises a frustum-shaped fourth friction surface, which is the mirror opposite of the second friction surface, faces the second friction surface and is concentric with respect to the axis and which concentrically encloses the third friction surface, and that the tensioning device, simultaneously with the first and third friction surfaces, also tensions the second and fourth friction surfaces with respect to one another, so that, in addition to the first and third friction surfaces, also the second and fourth friction surfaces hold the two rod holders between one another by way of frictional engagement to prevent rotation; and wherein the shaft is part of the tensioning device, and that the shaft transfers an axial tensioning force, used for tensioning the first friction surface and the third friction surface with respect to one another, from the second rod holder to the seventh friction surface.

\* \* \* \* \*